United States Patent [19]

Bertrand

[11] Patent Number: 4,868,887
[45] Date of Patent: Sep. 19, 1989

[54] CABLE-CAR WITH INFORMATION TRANSMISSION VIA THE CABLE

[75] Inventor: Jacques Bertrand, Fontaine, France

[73] Assignee: Pomagalski S.A., Fontaine, France

[21] Appl. No.: 244,596

[22] Filed: Sep. 13, 1988

Related U.S. Application Data

[63] Continuation of Ser. No. 19,977, filed as PCT FR86/00228 on Jun. 30, 1986, published as WO87/00368 on Jan. 15, 1987, abandoned.

[30] Foreign Application Priority Data

Jul. 1, 1985 [FR] France ................... 85 10511

[51] Int. Cl.⁴ .................................. H04B 5/00
[52] U.S. Cl. .......................... 455/41; 455/66
[58] Field of Search ............. 455/40, 41, 89, 66; 246/8, 30, 125; 340/539, 551, 993, 547, 595, 596; 381/79; 375/7

[56] References Cited

U.S. PATENT DOCUMENTS

| | | | |
|---|---|---|---|
| 2,427,979 | 9/1947 | Sorensen | 455/41 |
| 3,527,897 | 9/1970 | Sugi et al. | 455/41 |
| 3,758,775 | 9/1973 | Hopkins | 455/41 |
| 4,203,010 | 5/1980 | Brooks | 375/7 |

FOREIGN PATENT DOCUMENTS

| | | | |
|---|---|---|---|
| 1219017 | 1/1972 | France. | |
| 1460621 | 7/1980 | France. | |
| 0016332 | 2/1981 | Japan | 455/41 |

OTHER PUBLICATIONS

Electronique Industrielle, No. 66, Sep. 1963.

Primary Examiner—Robert L. Griffin
Assistant Examiner—Curtis Kuntz
Attorney, Agent, or Firm—Arnold, White & Durkee

[57] ABSTRACT

A terminal station of an aerial rope transport installation is equipped with a generator (26) of a high-frequency signal modulated in amplitude by the information to be transmitted. This generator (26) is coupled to the looped rope (10) by a transformer (30) which induces a current in the looped rope forming the secondary winding. The cars (20) are equipped with an autonomous receiver (48) which detects the magnetic field generated by the current induced in the looped rope and restores the information transmitted by the rope.

5 Claims, 2 Drawing Sheets

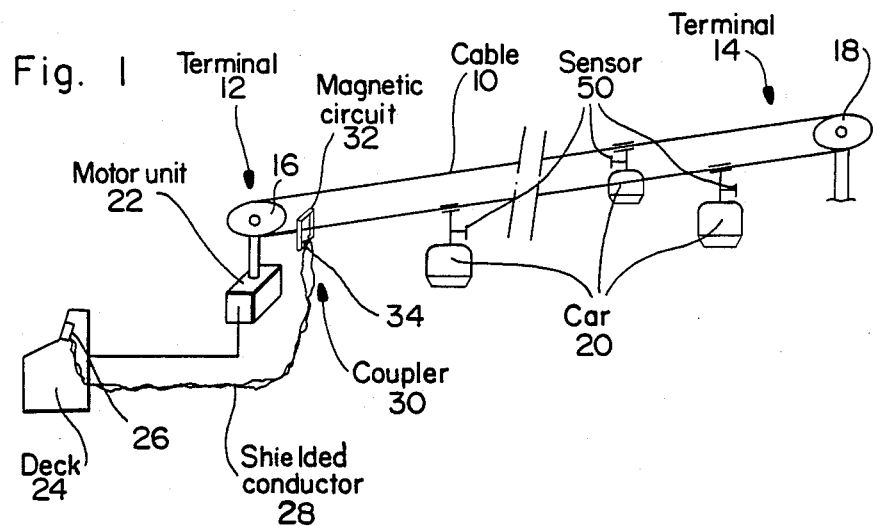
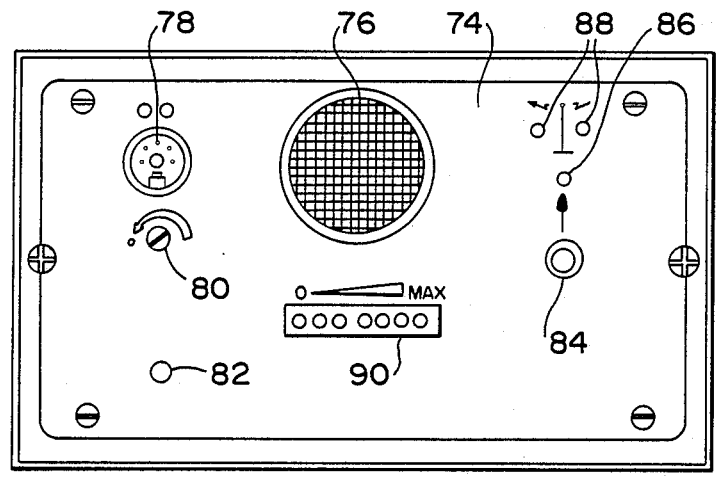

CABLE-CAR WITH INFORMATION TRANSMISSION VIA THE CABLE

This is a continuation of application Ser. No. 19,977 filed Feb. 3,1987 abandoned which is based on PCT Application PCT/FR8600228, filed June 30, 1986.

BACKGROUND OF THE INVENTION

The invention relates to an aerial transport installation by carrier-hauling cable according to the preamble of claim 1. A known installation of the kind mentioned, notably a gondola lift, comprises a radio link between the terminals and the cars to transmit information to the transported passengers, for example if an incident occurs. The radio link is subject to interference and blind areas and requires an authorization to transmit on a given frequency. It has already been proposed to overcome these drawbacks by using the cable as an electrical conductor transmitting signals to the cars or vehicles on the line. The cable must be isolated from the ground, which involves installation and supervision constraints and does not allow a lightning arrestor to be used. Another solution consists in creating a telephone link via a special wire, but this solution is costly and fragile.

Another known accomplishment (FR-A-1,219,017 and FR-A-1,460,621) is inductive transmission via the transporting cable using on emission and receipt annular or toroidal transformers through which the cable passes. This solution can be used for vehicles which remain permanently coupled to the cable, the cable not running on support or holding sheaves.

SUMMARY OF THE INVENTION

The object of the present invention is to achieve an information transmission device between the stations and the cars of a single-cable installation and this object is accomplished by implementation of the characteristics in claim 1.

The principle used is that of one-way coupling by inductive loop, this loop being constituted by the carrier-hauling cable, hereinafter called looped cable. In the transmission station or terminal a transmitter set induces in the looped cable a high-frequency current and each vehicle, hereinafter called car, on the line is fitted with a receiver set, having a sensor picking up the magnetic field caused by the current induced in the looped cable circuit. The sensor is a ferrite bar or open frame, of the type used in radio sets, having no electrical or mechanical connection with the cable. On transmission, coupling is performed by a current transformer, whose looped cable constitutes a single-turn secondary winding closed on itself. The current flowing in this winding induces a high-frequency. magnetic field over the whole surface bounded by the looped cable and all the cars in the vicinity of this cable can pick this field up.

The information transmitted may be a message or a safety signal and/or a musical or spoken sound content. The transmitter comprises for this purpose a high-frequency signal amplitude modulation, provided by an oscillator and the receiver comprises suitable processing circuits of the signal picked up to restore the word.

The device according to the invention has the advantage of using the hauling cable as a natural loop and avoids any other more or less complex, costly or constraining device being fitted. The inductive loop principle enables very low powers to be used and limits the field radiated in the immediate vicinity of the cable, unlike a radio link. The electrical resistance of the hauling cable is very low and the device is hardly sensitive to earth leakages. In addition, a short-circuit of the cable to earth is not inconvenient, which enables the earthing lightning arrestor device to be kept. The receiver which equips each car has no electrical or mechanical connection with the hauling cable, and the device is thereby particularly well-suited to detachable car installations. The radiated field is limited to the immediate vicinity of the cable and the cars on the parking or by-pass track are automatically disconnected. The number of cars on the line is not limited.

To avoid any operating constraints, the receivers advantageously comprise an autonomous electrical power source, for example by solar panel. A carrier detector in addition automatically limits the receiver operating time to the time required to transmit the messages only.

A second transmitter can be coupled to the cable, for example in the other terminal, which enables information to be transmitted to the cars from either of the terminals. This set can include a receiver to pick up the information emitted by the other terminal. According to an alternative embodiment, the device can be arranged to transmit to the cars or to the other terminal coded logic messages, then allowing remote indication without any wire connection. In a version with two or more emitters tuned to different frequencies or operating in turn, the device can be two-directional or multi-directional, transmitting words or logic signals between two or more points without any wire connection between these points.

BRIEF DESCRIPTION OF THE DRAWINGS

Other advantages and characteristics will become more clearly apparent from the following description of an embodiment of the invention, given as an example only, and represented in the accompanying drawings, in which:

FIG. 1 is a schematic view of an installation according to the invention;

FIG. 4 is a view of the front panel of the emitter set.

DESCRIPTION OF THE PREFERRED EMBODIMENTS

Figure 2:
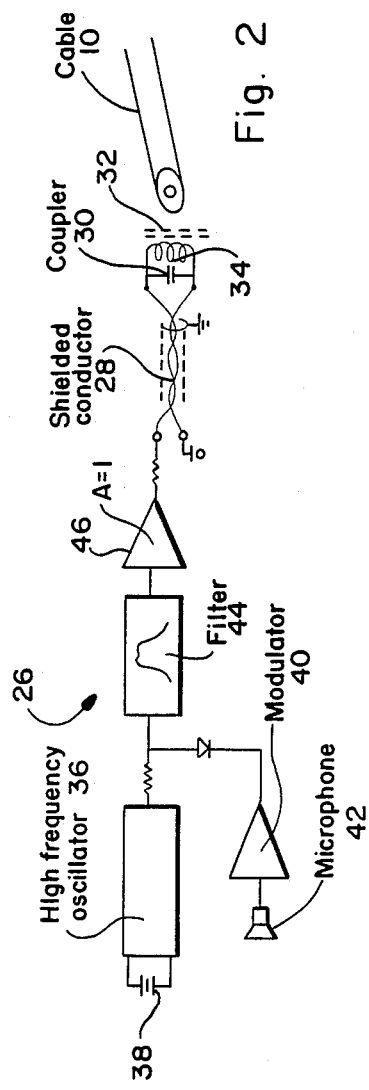
FIG. 2 shows the mimic diagram of the emitter set of the installation according to FIG. 1.
Figure 3:
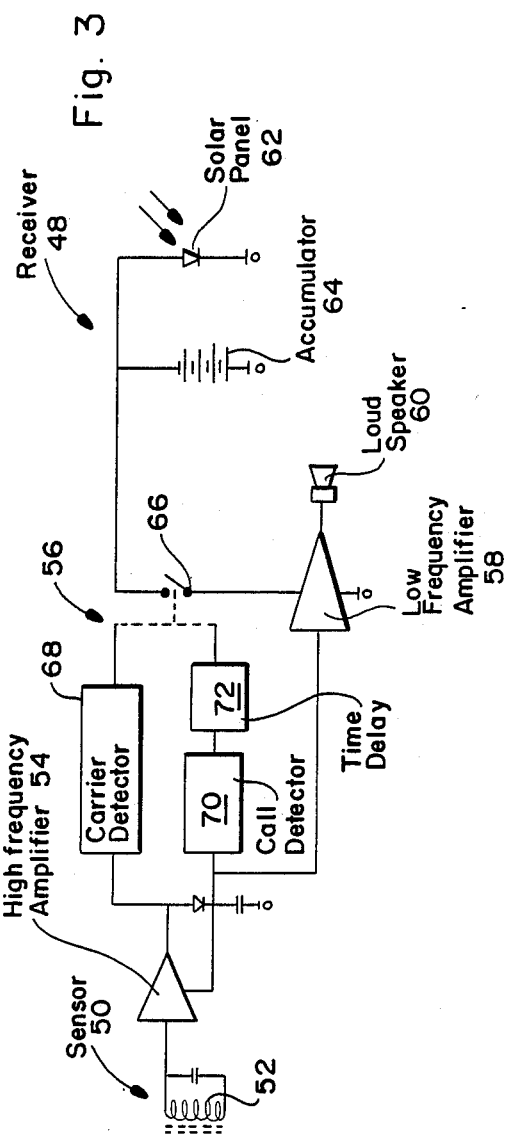
FIG. 3 shows the mimic diagram of the receiver set of the installation according to FIG. 1.

In FIG. 1, an aerial ropeway transport installation 10, an aerial ropeway transport installation 10, notably a cable-car, comprises two terminal stations 12, 14, having return bull-wheels 16, 18 on which the cable 10 passes to form a closed loop. The cable 10 is a carrier-hauling cable to which cars 20 are coupled on the line. The cars 20 can be of the detachable type in the terminal for loading and unloading of the passengers at reduced speed or at a standstill. The invention is described as being applied to a cable-car, but it can be used in any installation having a drive cable arranged in a closed loop, notably a looped rope gondola lift or transporter, or a chair-lift or a pulsed cable-car or likewise. The terminal 12 is a drive station with a wheel 16 driven by a motor unit 22 controlled from a control desk 24. The cable 10 can be supported by towers (not shown) spaced out along the line. An installation of this kind is well known in the art and it is not necessary to describe it in further detail.

The desk 24 of the station 12 comprises an emitter or transmitter set 26, connected by a shielded conductor 28 to an electrical coupler 30. This coupler 30 is a current transformer with an annular magnetic circuit 32 bearing a primary winding 34 connected to the shielded conductor 28. The cable 10 passes through the annular magnetic circuit 32 and constitutes the single-turn secondary winding of the transformer. The clearance between the cable 10 and the magnetic circuit 32 is sufficient to avoid any mechanical contact. An alternating current flowing through the primary winding 34 induces a current in the circuit formed by the looped cable 10. The transmitter set 26 comprises a high-frequency oscillator 36 supplied from a power source 38, which generates a square high-frequency signal, for instance of around 32 KHZ. This signal is modulated in amplitude by a modulator 40, controlled by a low-frequency signal, for instance emitted by a microphone 42. The modulated signal is filtered by a filter 44 and amplified at 46 and transmitted to the primary winding 34 by the shielded conductor 28. The current induced in the looped circuit of the cable 10 is an image of the modulated signal. The emitter 26 comprises in addition a call signal generator (not shown) emitting on a different frequency for transmission of the signals or of safety messages. The power supply to the transmitter 26 is by means of an external safety supply (not shown), put into operation automatically when a signal to be emitted is present, by any operative means.

Each car 20 is equipped with a receiver 48 having a sensor 50, fixed to the hanger arm in proximity to the cable 10. The sensor 50 is a ferrite bar with a winding 52, located in proximity to the cable to be subjected to the action of the magnetic field generated by the induced current flowing in the looped cable 10. The signal delivered by the sensor 50 is applied to a high-frequency amplifier 54 whose output is connected on the one hand to a transmission detector 56 and on the other hand to a low-frequency amplifier 58 whose output supplies a loud-speaker 60 or any other display or signalling device. The low-frequency amplifier 58 is supplied by an autonomous power supply, in this instance a solar panel 62 associated with an accumulator 64. A switch 66 is disposed in the power supply circuit of the low-frequency amplifier 58 to interrupt this power supply in the absence of a transmission to save power. The switch 66 is controlled by the transmission detector 56, which comprises a carrier detector 68 and a call detector 70, fitted in parallel. The call detector 70 has associated with it a time delay device 72, keeping the switch 66 closed for a predetermined time, for example 30 seconds. The call detector 70 detects transmission of a safety signal, emitted on a different frequency by the transmitter 26, for receipt of a safety message the duration of which is limited to 30 seconds. The carrier detector 68 detects a normal transmission and switches the receiver 48 into operation by closing the switch 66 for receipt of this transmission. The receiver 48 is on permanent standby at low power consumption and comes into operation automatically. It does not require any human intervention or any special maintenance, and is fully autonomous.

Referring to FIG. 4, it can be seen that the front panel 74 of the transmitter set 26 comprises a microphone 76, a connector 78 for connecting a sound recorder and a sound level adjustment button 80. A lamp 82 indicates that the transmitter is powered on. A button 84 enables a priority safety message to be emitted, by means of a special frequency generator, with indication by a lamp 86. Lamps 88 indicate that the coupler 30 is supplied by the transmission signal and an indicator 90 indicates the sound level. The number of lamps 88 corresponds to the number of couplers 30, for example two in the case of an installation having two parallel carrier-hauling cables.

The transmission device operates in the following way:

The operator can broadcast a musical sound by connecting a tape recorder to the connector 78. Transmission is automatically put into operation by detection of the presence of a signal to be transmitted. The modulated high-frequency signal, transmitted by the transmitter 26, induces in the looped rope 10 a high-frequency current which generates a magnetic field along the whole line. The sensors 50 of the cars 20 on the line detect this magnetic field and the signals emitted by these sensors 50 put the receivers 48 into operation by closing the switches 66. The information picked up is transmitted to the loud-speaker 60 of the car 20. The solar panel 62 provides the energy in association with the accumulator 64 in case there is no sun. The operator supervises transmission by means of the lamps 88 and adjusts the intensity by means of the button 80 according to the indications given by the indicator 90.

The operator can transmit a priority call signal by pressing the button 84 and transmitting the message via the microphone 76.

The call detector 70 of the receiver 48 detects this call signal and keeps the receiver in operation for 30 seconds. It is clear that other uses are possible, a simplified system comprising, for example, only a microphone for transmitting messages or a more elaborate system ensuring two-directional transmission of supervision and/or command signals between the line components, notably the terminals, towers, cars and suchlike, these signals being able to be logic signals.

The invention is of course in no way limited to the embodiment more particularly described herein.

I claim:
1. An aerial transport apparatus having two terminal stations equipped with return bull-wheels, and a carrier-hauling cable, extending in a closed loop between said stations, said apparatus comprising:
  carriage means which run between the two terminals attached to said cable and which are detechable from said cable in the terminals;
  a transmission system for transmitting information from the terminals to the carriage means which comprises a transmitter set coupled inductively to said cable and located in one of the terminals and including an annular-shaped magnetic circuit through which the cable passes, an air gap provided between said cable and said annular-shaped magnetic circuit, and a primary winding supplied by the transmitter set to induce a modulated current carrying said information in said loop of the cable, which generates a magnetic field; and
  a receiver set located on said carriage means to receive information emitted by said transmitter set, said receiver set mechanically uncoupled from the cable such that said carriage means can be detached from the cable and including as magnetic sensor having a ferrite bar fitted on the carriage means in proximity to and facing said cable while having passing through it the magnetic field gener- ated by said modulated current, induced in the loop of the cable by the transmitter set.

2. An apparatus according to claim 1, wherein the transmitter set induces in said rope a high frequency current modulated by said information.

3. An apparatus according to claim 1, wherein the receiver set comprises an autonomous power supply having a solar panel associated with an accumulator and an energy-saving device interrupting the power supply in the absence of emission by the transmitter set.

4. An apparatus according to claim 1, wherein the transmitter set comprises a high-frequency oscillator, of around 32 KHz, and an amplitude modulator of the high-frequency signal.

5. An apparatus according to claim 4, wherein the transmitter set comprises a call signal generator on a special frequency for priority transmission of safety messages.

* * * * *